US008958560B2

(12) United States Patent  (10) Patent No.: US 8,958,560 B2
Kipnis et al.  (45) Date of Patent: Feb. 17, 2015

(54) EFFICIENT MULTIVARIATE SIGNATURE GENERATION

(75) Inventors: Aviad Kipnis, Efrat (IL); Yaron Sella, Beit Nekofa (IL); Yaacov Belenky, Maaleh Adumim (IL)

(73) Assignee: Cisco Technology Inc., San Jose, CA (US)

( * ) Notice: Subject to any disclaimer, the term of this patent is extended or adjusted under 35 U.S.C. 154(b) by 185 days.

(21) Appl. No.: 13/699,912

(22) PCT Filed: Dec. 14, 2010

(86) PCT No.: PCT/IB2010/055810
§ 371 (c)(1),
(2), (4) Date: Jan. 7, 2013

(87) PCT Pub. No.: WO2011/151680
PCT Pub. Date: Dec. 8, 2011

(65) Prior Publication Data
US 2013/0129090 A1  May 23, 2013
US 2013/0294601 A9  Nov. 7, 2013

(30) Foreign Application Priority Data

Jun. 2, 2010 (IL) .......................................... 206139

(51) Int. Cl.
*H04L 9/00* (2006.01)
*H04L 9/30* (2006.01)
(Continued)

(52) U.S. Cl.
CPC ................. *H04L 9/30* (2013.01); *H04L 9/0838* (2013.01); *H04L 9/0813* (2013.01); *H04L 9/0822* (2013.01);
(Continued)

(58) Field of Classification Search
CPC ... H04L 9/0816; H04L 9/0819; H04L 9/0822; H04L 9/0825; H04L 9/0838; H04L 9/00; H04L 9/0813
USPC .......................................................... 380/255
See application file for complete search history.

(56) References Cited

U.S. PATENT DOCUMENTS 5,263,085 A * 11/1993 Shamir ........................... 380/30
7,100,051 B1   8/2006 Kipnis et al.
(Continued)

FOREIGN PATENT DOCUMENTS

FR       2 815 493 B1    12/2004
WO   WO 2009/115824 A1    9/2009

OTHER PUBLICATIONS

Oct. 7, 2013 Office Communication in connection with prosecution of EP 10 816 443.5.
(Continued)

*Primary Examiner* — Krisna Lim
(74) *Attorney, Agent, or Firm* — Husch Blackwell LLP

(57) ABSTRACT

A cryptographic method and apparatus, including providing a public key that defines a multivariate polynomial mapping Q( ) over a finite field F, extracting a first vector Y of verification values from a message, computing over the first vector, using a processor, a digital signature X including a second vector of signature values such that application of the mapping to the digital signature gives a third vector Q(X) of output values such that each output value is equal to a corresponding element of a vector sum $Y+aY_{SHIFT}$ over F, wherein $Y_{SHIFT}$ is a shifted version of Y, and a∈F, and conveying the message with the digital signature to a recipient for authentication using the public key. Related methods, systems, and apparatus are also described.

32 Claims, 3 Drawing Sheets

(51) Int. Cl.
*H04L 9/32* (2006.01)
*H04L 9/08* (2006.01)

(52) U.S. Cl.
CPC ............. *H04L 9/0825* (2013.01); *H04L 9/0819* (2013.01); *H04L 9/3073* (2013.01); *H04L 9/3247* (2013.01); *H04L 2209/12* (2013.01); *H04L 9/3093* (2013.01)
USPC ........................................................ 380/255

(56) References Cited

U.S. PATENT DOCUMENTS

| | | | | |
|---|---|---|---|---|
| 8,732,457 | B2* | 5/2014 | Micali | 713/156 |
| 2001/0012301 | A1* | 8/2001 | Yi et al. | 370/439 |
| 2004/0151309 | A1* | 8/2004 | Gentry et al. | 380/30 |
| 2008/0013716 | A1 | 1/2008 | Ding | |
| 2009/0010428 | A1 | 1/2009 | Delgosha et al. | |
| 2009/0187766 | A1* | 7/2009 | Vuillaume et al. | 713/176 |

OTHER PUBLICATIONS

Transmittal of International Search Report and Written Opinion of International Searching Authority (Jun. 7, 2011) for captioned application.

Crystal Clough et al., "Square, A New Multivariate Encryption Scheme".

Jintai Ding et al., "Could Sflash Be Repaired," *ICALP* 2008, pp. 691-701 (Springer-Verlag 2008).

Jintai Ding et al., "$\ell$ —Invertible Cycles for Multivariate Quadratic Public Key Cryptography," *Public Key Cryptography* 2007, pp. 266-281 (Int'l Assoc. for Cryptologic Research 2007).

Jintai Ding et al., "Rainbow, A New Multivariable Polynomial Signature Scheme," *ACNS* 2005, pp. 164-175 (Springer-Verlag 2005).

Xin Jiang et al., "Constructing Linear Transformations of MPKC by Generalized Central Symmetric Matrices" (2009).

Tsutomu Matsumoto et al., "Public Quadratic Polynomial-Tuples for Efficient Signature-Verification and Message-Encryption," *Advances in Cryptology-Eurocrypt '88 Lecture Notes in Computer Science*, pp. 419-453 (Springer-Verlag 1998).

Jacques Patarin, "Cryptanalysis of the Matsumoto and IMAI Public Key Scheme of Eurocrypt '88," *Advances in Cryptology-CRYPTO '95*, pp. 248-261 (Springer-Verlag 1995).

Jacques Patarin, "Hidden Field Equations (HFE) and Isomorphisms of Polynomials (IP): Two New Families of Asymmetric Algorithms," *Eurocrypt '96 Proceedings*, pp. 35-48 (Springer-Verlag 1996).

Christopher Wolf et al., "Taxonomy of Public Key Schemes Based on the Problem of Multivariate Quadratic Equations" (Dec. 15, 2005).

Bo-Yin Yang et al., "Implementing Minimized Multivariate PKC on Low-Resource Embedded Systems," *SPC 2006*, pp. 73-88 (Springer-Verlag 2006).

* cited by examiner

EFFICIENT MULTIVARIATE SIGNATURE GENERATION

RELATED APPLICATION INFORMATION

The present application is a 35 USC §371 application of PCT/IB2010/055810, filed on 14 Dec. 2010 and entitled "Efficient Multivariate Signature Generation", which was published in the English language with International Publication Number WO 2011/151680, and which claims the benefit of priority from IL Patent Application IL 206139 of NDS Limited, filed 2 Jun. 2010.

FIELD OF THE INVENTION

The present invention relates generally to methods and systems of cryptography, and specifically to public-key signature schemes.

BACKGROUND OF THE INVENTION

Public-key cryptographic techniques are widely used for encryption and authentication of electronic documents. Such techniques use a mathematically-related key pair: a secret private key and a freely-distributed public key. For authentication, the sender uses a private key to compute an electronic signature over a given message, and then transmits the message together with the signature. The recipient verifies the signature against the message using the corresponding public key, and thus confirms that the document originated with the holder of the private key and not an impostor.

Commonly-used public-key cryptographic techniques, such as the Rivest Shamir Adleman (RSA) algorithm, rely on numerical computations over large finite fields. To ensure security against cryptanalysis, these techniques require the use of large signatures, which are costly, in terms of memory and computing power, to store and compute. These demands can be problematic in applications such as smart cards, in which computing resources are limited.

Various alternative public-key signature schemes have been developed in order to reduce the resource burden associated with cryptographic operations. One class of such schemes is based on solution of multivariate polynomial equations over finite fields. These schemes can offer enhanced security while operating over relatively small finite fields. Most attention in this area has focused on multivariate quadratic (MQ) equations. A useful survey of work that has been done in this area is presented by Wolf and Preneel in "Taxonomy of Public Key Schemes Based on the Problem of Multivariate Quadratic Equations," Cryptology ePrint Archive, Report 2005/077 (2005), which is incorporated herein by reference.

SUMMARY

Embodiments of the present invention that are described hereinbelow provide a multivariate polynomial scheme for public-key signature with enhanced computational efficiency.

There is therefore provided, in accordance with an embodiment of the present invention, a cryptographic method, including providing a public key that defines a multivariate polynomial mapping Q( ) over a finite field F. A first vector Y of verification values is extracted from a message. A processor computes over the first vector a digital signature X including a second vector of signature values such that application of the mapping to the digital signature gives a third vector Q(X) of output values such that each output value is equal to a corresponding element of a vector sum $Y+aY_{SHIFT}$ over F, wherein $Y_{SHIFT}$ is a shifted version of Y, and $a \in F$. The message is conveyed with the digital signature to a recipient for authentication using the public key.

In a disclosed embodiment, the method includes receiving the message with the digital signature, extracting the first vector Y of the verification values from the received message, and authenticating the message by applying the mapping defined by the public key to find the output values, and finding a factor $a \in F$ such that each output value is equal to the corresponding element of the vector sum $Y+aY_{SHIFT}$.

Typically, extracting the first vector includes applying a predefined hash function to the message, and the multivariate polynomial mapping is a quadratic mapping.

In some embodiments, computing the digital signature includes applying an affine transform $B^{-1}$ to the first vector Y in order to compute an intermediate vector Z', and applying a univariate polynomial function $P^{-1}(Z')$, corresponding to the multivariate polynomial mapping, over an extension field of F in order to find the digital signature in a polynomial representation X'. Typically, B includes a right-to-left Toeplitz matrix.

In a disclosed embodiment, $P^{-1}(Z')=(U(T))^d Z'^d$, wherein U is a polynomial in the extension field over a variable T with at least one coefficient given by the factor a, and d is an exponent, and wherein computing the digital signature includes precomputing and storing respective power vectors $V_a=(U(T))^d$ for multiple possible factors $a \in F$, and using the stored power values in order to compute and test multiple candidate digital signatures X' for a given exponentiation of $Z' \to Z'^d$. Typically, $U(T)=(1+aT)$. Additionally or alternatively, the multivariate polynomial mapping Q( ) includes at least one additional constraint not imposed by the univariate polynomial function, and computing the digital signature includes testing the multiple candidate digital signatures X' for different power vectors V, in order to find the digital signature X that satisfies the at least one additional constraint.

Further additionally or alternatively, applying the affine transform includes setting at least one of the values $y_i$ in the first vector Y so that at least one corresponding intermediate value in the intermediate vector Z' is zero, and providing the public key includes discarding at least one equation corresponding to the at least one of the values $y_i$ from the multivariate polynomial mapping Q( ) that is defined by the public key.

There is also provided, in accordance with an embodiment of the present invention, a cryptographic method, including receiving a message with a digital signature X, for verification using a predefined public key, which defines a multivariate polynomial mapping Q( ) over a finite field F. A first vector Y of verification values is extracted from the received message. The multivariate polynomial mapping is applied to the digital signature so as to find a second vector of output values Q(X). The message is authenticated by finding a factor $a \in F$ such that each output value is equal to the corresponding element of a vector sum $Y+aY_{SHIFT}$.

Typically, the method includes rejecting the message if no factor $a \in F$ can be found to authenticate the message.

There is additionally provided, in accordance with an embodiment of the present invention, cryptographic apparatus, including a memory, which is configured to store a private key corresponding to a public key that defines a multivariate polynomial mapping Q( ) over a finite field F. A processor is configured to extract a first vector Y of verification values from a message, and to compute over the first vector, using the private key, a digital signature X including a second vector of signature values such that application of the mapping to the digital signature gives a third vector Q(X) of output values such that each output value is equal to a corresponding element of a vector sum Y+aY$_{SHIFT}$ over F, wherein Y$_{SHIFT}$ is a shifted version of Y, and a∈F, and to convey the message with the digital signature to a recipient for authentication using the public key.

In a disclosed embodiment, the apparatus includes a device coupled to receive the message with the digital signature, to extract the first vector Y of the verification values from the received message, and to authenticate the message by applying the mapping defined by the public key to find the output values, and finding a factor a∈F such that each output value is equal to the corresponding element of the vector sum Y+aY$_{SHIFT}$.

There is further provided, in accordance with an embodiment of the present invention, cryptographic apparatus, including a memory, which is configured to store a predefined public key, which defines a multivariate polynomial mapping Q( ) over a finite field F. A processor is configured to receive a message with a digital signature X, for verification using the public key, to extract a first vector Y of verification values from the received message, to apply the multivariate polynomial mapping to the digital signature so as to find a second vector of output values Q(X), and to authenticate the message by finding a factor a∈F such that each output value is equal to the corresponding element of a vector sum Y+aY$_{SHIFT}$.

There is moreover provided, in accordance with an embodiment of the present invention, a computer software product, including a computer-readable medium in which program instructions are stored, which instructions, when read by a processor, cause the processor to read from a memory a private key corresponding to a public key that defines a multivariate polynomial mapping Q( ) over a finite field F, to extract a first vector Y of verification values from a message, to compute over the first vector, using the private key, a digital signature X including a second vector of signature values such that application of the mapping to the digital signature gives a third vector Q(X) of output values such that each output value is equal to a corresponding element of a vector sum Y+aY$_{SHIFT}$ over F, wherein Y$_{SHIFT}$ is a shifted version of Y, and a∈F, and to convey the message with the digital signature to a recipient for authentication using the public key.

There is furthermore provided, in accordance with an embodiment of the present invention, a computer software product, including a computer-readable medium in which program instructions are stored, which instructions, when read by a processor, cause the processor to read from a memory a predefined public key, which defines a multivariate polynomial mapping Q( ) over a finite field F, to receive a message with a digital signature X, for verification using the public key, to extract a first vector Y of verification values from the received message, to apply the multivariate polynomial mapping to the digital signature so as to find a second vector of output values Q(X), and to authenticate the message by finding a factor a∈F such that each output value is equal to the corresponding element of a vector sum Y+aY$_{SHIFT}$.

The present invention will be more fully understood from the following detailed description of the embodiments thereof, taken together with the drawings in which:

DETAILED DESCRIPTION OF EMBODIMENTS

Overview

Figure 1:
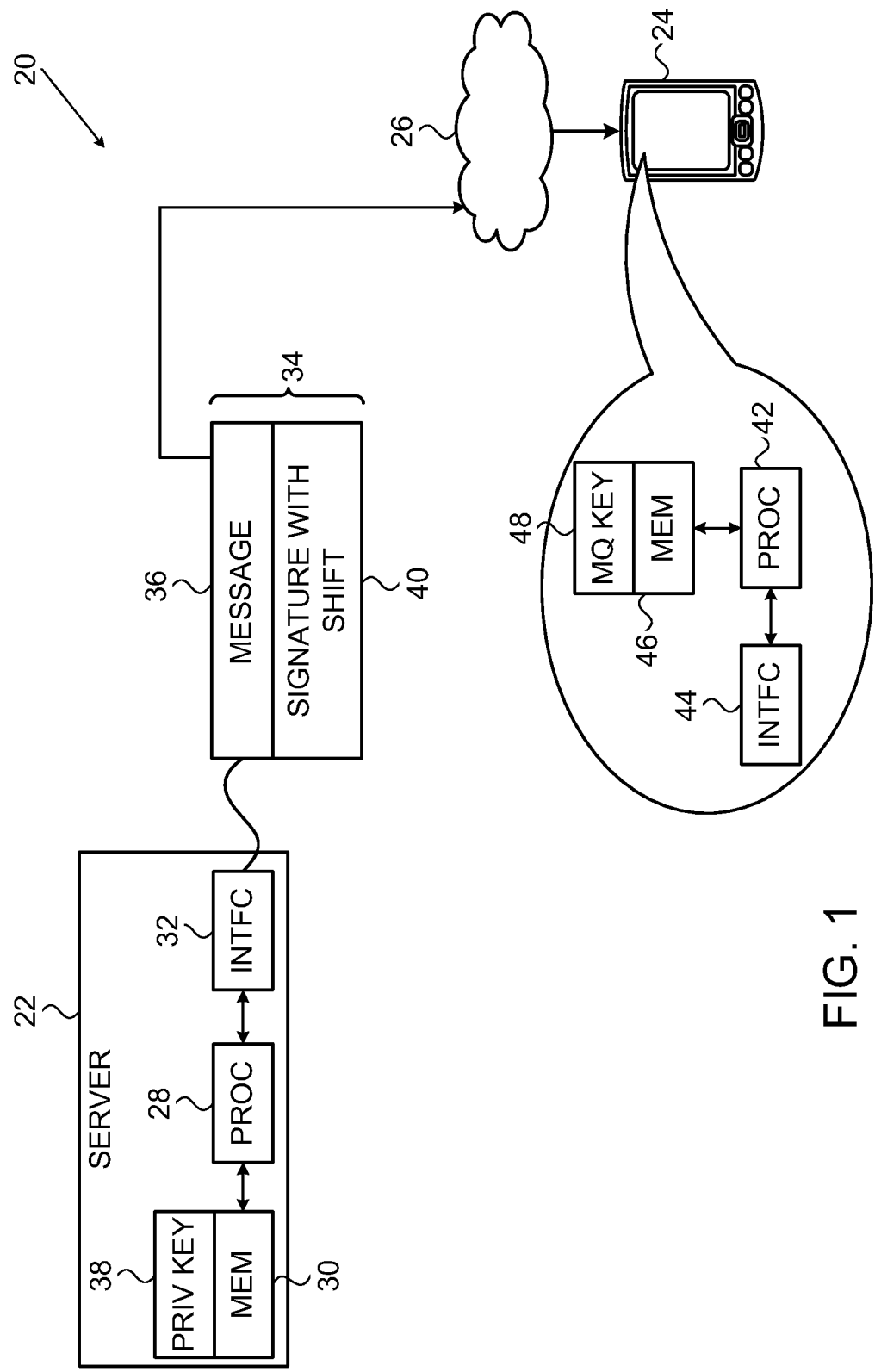
FIG. 1 is a block diagram that schematically illustrates a data communication system in which messages are authenticated using a public-key signature, in accordance with an embodiment of the present invention.

Embodiments of the present invention that are described hereinbelow provide a new public-key signature scheme, using multivariate polynomial equations, that can be implemented with relatively low expenditure of computational resources, while still providing high security against attack. This new scheme can use relatively short signatures (by comparison with methods that are currently in common use, such as RSA) and requires less computation for signature generation than other proposed multivariate polynomial schemes. The disclosed embodiments are based on multivariate quadratic equations, but the principles of the present invention may be extended, mutatis mutandis, to multivariate polynomial equations of higher order.

To enable authentication of a message, the sender uses a private key to generate a digital signature over the message, using techniques described below. The signature has the form of a vector of values $X=(x_0, \ldots, x_{n-1})$ in a finite field F having p elements. To verify the authenticity of the message, the recipient uses a polynomial mapping, typically having the form of multivariate quadratic mapping Q( ) over F. This mapping comprises a set of multivariate quadratic equations $Q_0( ), Q_1( ), \ldots, Q_m( )$ of the form:

$$Q_i(X) = \sum_{j,k} \gamma_{i,j,k} x_j x_k + \sum_j \beta_{i,j} x_j + \alpha_i$$

The mapping coefficients $\gamma_{i,j,k}$, $\beta_{i,j}$ and $\alpha_i$ are specified by the public key distributed by the sender of the message, i.e., the public key specifies the values of the coefficients that are to be used in the quadratic mapping by the recipient in authenticating the signature.

To compute the digital signature, the sender extracts a vector Y of verification values from the message, typically by applying a predefined hash function to the message. The sender then applies a sequence of transformations defined by the sender's private key to find the signature X. At the core of these transformations is a univariate polynomial function P(X), as defined below, corresponding to the multivariate polynomial mapping that is used in verifying the signature. (As explained in the above-mentioned article by Wolf and Preneel, there is a direct correspondence between these univariate and multivariate representations.) The univariate polynomial function operates over an extension field of F, whose members can be represented as polynomials of the form $X'=a_0+a_1 T+ \ldots +a_{n-1}T^{n-1}$ in a variable T, and there is an irreducible polynomial of degree n that operates in a manner equivalent to the modulus in number fields. (Irreducible polynomials can be found by choosing polynomials at random and testing for reducibility until an irreducible polynomial is found, or by selection from published tables of irreducible polynomials.) The coefficients $a_0, a_1, \ldots, a_{n-1}$ correspond to the vector elements of X in the multivariate representation. In the univariate representation, $P(X)=X^m$, wherein m and $p^n-1$ are relatively prime, so that P(X) is invertible, and its inverse $P^{-1}(X)=X^d$ for some d.

In embodiments of the present invention, the private key-based computation for deriving the signature X of a verification vector Y is defined such that $X=A^{-1}X'$, and $X'=P^{-1}(Z)Z^d$, $Z=B^{-1}Y$, and A and B are affine transforms. Computing the signature X in the polynomial representation facilitates efficient computation, but this computation still involves the modular exponentiation $Z^d$, which is computationally costly. To protect the set of multivariate quadratic equations defined by the public key against algebraic attack, it is desirable to obfuscate the signature computation still further by adding constraints to the equations in Q( ). As a result, however, not every possible signature X for a given verification vector Y will give a valid verification result under Q(X). To sign a given message, it may thus be necessary to compute X multiple times for different choices of the intermediate vector Z, and then to test each X by trial and error until a valid signature is found.

To avoid the need to repeat the costly computation of $Z^d$ for each new trial value of X, the intermediate vector Z is redefined in embodiments of the present invention as the product $Z=U(T)Z'$, wherein U(T) is a predefined polynomial. For mathematical simplicity in the embodiments described below, $U(T)=1+aT$, a first-order polynomial, wherein $a \in F$, but other, higher-degree polynomials may similarly be used. The sender pre-computes and stores power vectors of the form $V_a=(U(T))^d$ for multiple possible factors $a \in F$ (typically for all such possible factors). The exponent $Z^d=(U(T))^d Z'^d = V_a Z'^d$, wherein $V_a$ depends only on the value of a. Therefore, multiple values of $Z^d$ can be computed and evaluated by performing the exponentiation $Z'^d$ only once and then multiplying by the different stored vectors $V_a$ in turn. Thus, the computational cost of finding a valid signature X, meeting all constraints, is substantially reduced.

This change in the definition of the intermediate vector limits the form of the affine transform B and, furthermore, alters the way in which the signature is authenticated by the recipient of the message. Thus, in some embodiments of the present invention, B has the form of a right-to-left (RTL) diagonal Toeplitz matrix, as defined hereinbelow. The authentication criterion for the digital signature X is not simply Q(X)=Y, but rather involves a vector sum: When $U(T)=1+aT$, a valid signature X satisfies $Q(X)=Y+aY_{SHIFT}$, wherein $Y_{SHIFT}$ is a shifted version of Y (i.e., $Q_0(X)=y_0+ay_1$; $Q_1(X)=y_1+ay_2$; and so forth).

To authenticate a given message with signature X, the recipient applies the mapping defined by the public key to find the output values Q(X). The recipient then evaluates different possible factors $a \in F$ by solving the vector sum $Y+aY_{SHIFT}$ until it finds the factor a that satisfies $Q(X)=Y+aY_{SHIFT}$. The factor a is therefore referred to hereinbelow as the shift factor. The evaluation can be carried out simply and efficiently, without any need to try all $a \in F$ by brute force. Rather, the recipient computes an initial value $a=(Q_0-Y_0)/Y_1$ or $a=0$ if $Y_1=0$ and then verifies that this value satisfies the remaining equations. If a valid factor a is found, the recipient accepts the message as authentic; otherwise, the message is rejected.

System Description and Operation

FIG. 1 is a block diagram that schematically illustrates a data communication system 20 using the sort of digital signature scheme that is described above, in accordance with an embodiment of the present invention. System 20 is shown and described here for the sake of example, to illustrate a typical configuration in which such digital signatures may be used, but is not meant to limit the application of such signatures to this sort of context.

In the pictured embodiment, a computer, such as a server 22 transmits data over a network 26 to a receiving device 24. Device 24 may comprise a media player, for example, either fixed or mobile, which comprises an embedded processor or has a plug-in smart card or key. Such devices typically have limited memory and computational resources, making the low resource demands of the present digital signature technique particularly attractive. Alternatively, the recipient of the data may be a general-purpose computer or other computing device.

Before beginning media transmission, server 22 and device 24 conduct an authentication procedure, which may include transmission of one or more authentication frames 34. This procedure may be repeated subsequently if desired. In the example shown in the figure, a processor 28 in server 22 generates a message 36 for transmission to device 24. Processor 28 computes a signature 40, denoted X, over message 36 using a private key 38 that is stored in a memory 30. The signature is computed using a shift factor a, as defined above. The server then transmits frame 34, comprising message 36 and signature 40, via an interface 32 over network 26 to device 24.

A processor 42 associated with device 24 receives frame 34 via an interface 44. Processor 42 sets up a quadratic mapping Q( ) using a public multivariate quadratic (MQ) key 48 that is stored in a memory 46. This key may be preinstalled in memory 46, or it may be downloaded to device 24 from server 22 or from another trusted source. Processor 42 applies the quadratic mapping to signature 40, giving Q(X), and compares the resulting output values to a verification vector, denoted Y, derived from message 36. If processor 42 is able to find a value $a \in F$ satisfying $Q(X)=Y+aY_{SHIFT}$, it authenticates the message as having originated from server 22, and media transmission proceeds. As noted above, for this purpose the processor computes an initial value $a=(Q_0-Y_0)/Y_1$ and then verifies that this value satisfies the remaining equations.

Typically, processor 28, and possibly processor 42, as well, comprise general-purpose computer processors, which are programmed in software to carry out the functions that are described herein. This software may be downloaded to the either of the processors in electronic form, over a network, for example. Alternatively or additionally, the software may be provided on tangible, non-transitory storage media, such as optical, magnetic, or electronic memory media. Further alternatively or additionally, some or all of these processing functions may be performed by special-purpose or programmable digital logic circuits.

As noted above, FIG. 1 shows a certain operational configuration in which the signature scheme described herein may be applied. This same scheme may be applied in signing not only authentication frames transmitting over a network, but also in signing documents and files of other types, whether transmitted or locally stored. For the sake of convenience and clarity, the embodiments and claims in this patent application refer to computation of a signature over a message, but the term "message" should be understood, in the context of the present patent application and in the claims, as referring to any sort of data that is amenable to signature by the present scheme.

Methods of Computation and Authentication

Figure 2:
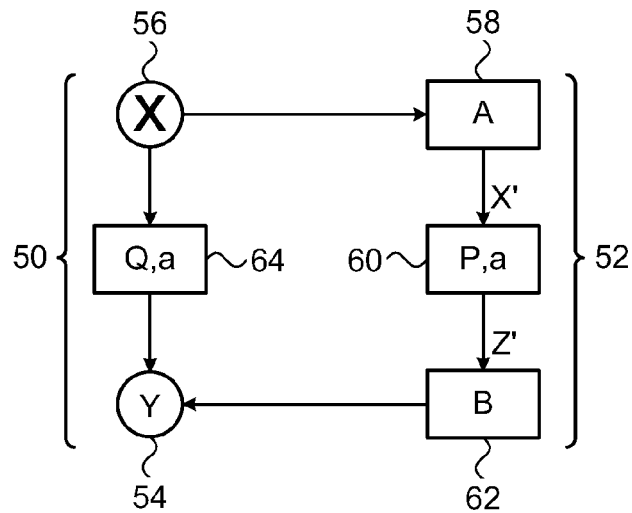
FIG. 2 is a flow chart that schematically illustrates components of public- and private-key signature computations, in accordance with an embodiment of the present invention.

FIG. 2 is a flow chart that schematically illustrates components of public- and private-key signature computations, in accordance with an embodiment of the present invention. The chart includes a public key-based computation 50 and a private key-based computation 52, both of which take a signature vector 56, denoted $X=(x_0, \ldots, x_{n-1})$, into a verification vector 54, denoted $Y=(y_0, \ldots, y_{n-1})$. Although the signature and verification vectors are represented, for the sake of convenience, as being having length n, they may alternatively be of different lengths.

Public key-based computation 50, which is conducted by the recipient of the signed message (such as device 24), uses the multivariate quadratic mapping Q( ) which is defined by the public key, along with the shift factor a, to verify that $Q(X)=Y+aY_{SHIFT}$. As noted earlier, $Y_{SHIFT}=(y_2, y_2, \ldots)$ contains the elements of Y shifted over one element. In other words, the public key-based computation verifies that:

$$Q_0(X) = y_0 + ay_1$$
$$Q_1(X) = y_1 + ay_2$$
$$\ldots$$
$$Q_{n-3}(X) = y_{n-3} + ay_{n-2}$$

$Q_{n-1}$ is undefined, and $Q_{n-2}(X)=y_{n-2}\ ay_{n-1}$ is also omitted from the public key to avoid revealing the value of $y_{n-1}$ (which could otherwise create a security problem because of the manner in which X is computed using the private key, as explained below). Inversion of this sort of mapping is computationally hard, thus providing security against attack.

The security of the signature scheme against algebraic attack may be further enhanced by altering the mapping that is defined by the public key. For this purpose, certain equations in Q( ) may be perturbed; additional equations (besides $Q_{n-1}$ and $Q_{n-2}$) may be discarded; equations may be rewritten over a reduced input space; or different schemes may be combined. Such measures are described, for example, by Clough et al., in "Square, a New Multivariate Encryption Scheme," *Topics in Cryptology*—CT-RSA 2009 (LNCS 5473), pages 252-264, which is incorporated herein by reference.

Private key-based computation 52 includes a first affine transform 58, having the form of a matrix A, which transforms X into a vector X'. A univariate polynomial function 60, denoted P( ) operates on the polynomial representation of X' to generate the intermediate vector $Z'=(z'_0, \ldots, z'_{n-1})$, with $z'_{n-1}=0$, in the polynomial form $P(X')=(1+aT)Z'$. A further affine transform 62, given by a matrix B, transforms Z' into Y. The signer of a message (such as server 22) performs the inverse steps: $B^{-1}, P^{-1}, A^{-1}$, to derive the signature X from Y. (In contrast to the multivariate quadratic mapping defined by the public key, each of the steps in the private key-based computation is easily inverted.) The inverse function $P^{-1}(Z)=Z^d=(1+aT)^d Z^{td}$, as noted above.

When the public key-based mapping Q( ) is altered, as explained above, it imposes additional constraints to be applied by public key-based computation 50. In this case, not every X that results from inverting the elements of private key-based computation 52 will satisfy the public-key based mapping. To deal with this limitation, the signer typically tests each value of X to verify that it satisfies the public-key based mapping, and discards unsuitable values until a satisfying signature is found.

Figure 3:
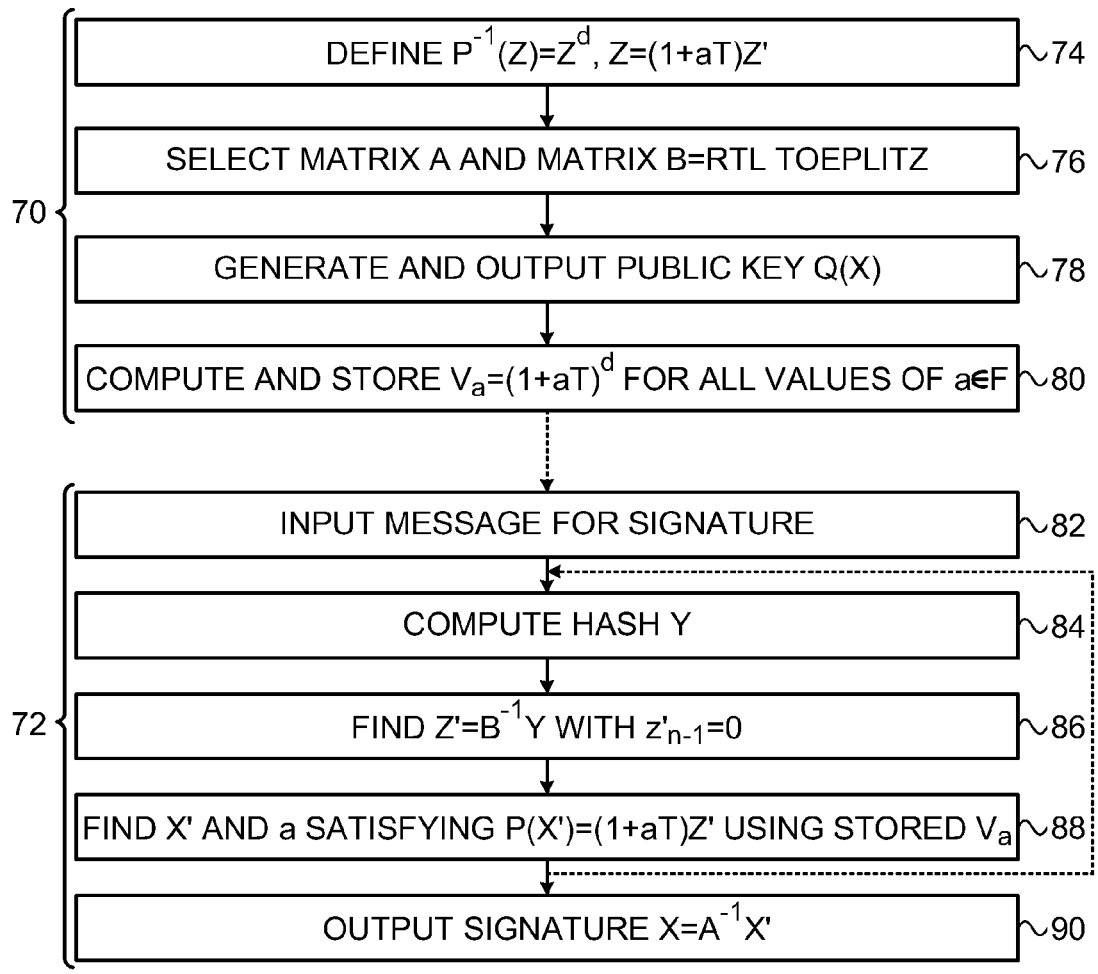
FIG. 3 is a flow chart that schematically illustrates a method for computing a digital signature, in accordance with an embodiment of the present invention.

FIG. 3 is a flow chart that schematically illustrates a method for computing the digital signature X, in accordance with an embodiment of the present invention. The method comprises two parts: a preliminary computation 70, which can be performed in advance, before there is a message to be signed; and an in-line computation 72, performed over each message. For clarity of description, the method will be described with reference to the components of server 22 (FIG. 1).

The private key to be used by server 22 defines the polynomial function P( ) at a private function definition step 74. As explained above, this function is defined such that $P^{-1}(Z)=Z^d$, and $Z=(1+aT)Z'$. This definition of Z mandates that the affine transform matrix B have a right-to-left (RTL) diagonal Toeplitz form, meaning that each row is a copy of the row above it, but shifted one place to the left:

$$B = \begin{pmatrix} b_0 & b_1 & b_2 & \ldots & b_{n-1} \\ b_1 & b_2 & b_3 & \ldots & b_n \\ b_2 & b_3 & b_4 & \ldots & b_{n+1} \\ b_3 & b_4 & b_5 & \ldots & b_{n+2} \\ \ldots & \ldots & \ldots & \ldots & \ldots \end{pmatrix}$$

This matrix and the matrix A, are components of the private key, which are defined at a matrix definition step 76.

Processor 28 uses these private key elements together in computing the public key that defines the coefficients of the multivariate quadratic mapping Q( ) at a public key computation step 78. (Details of this computation are presented, for example, by Wolf and Preneel.) The public key may be transmitted over network 26 or otherwise conveyed to device 24. The elements of the private key are stored by processor 28 in memory 30. As explained above, processor 28 also computes and stores the set of vectors $V_a=(1+aT)^d$ for all values of the shift factor a in the finite field F, at a vector pre-computation step 80.

In-line computation 72 typically begins when processor 28 receives a message for signature, at a message input 82. The processor extracts a verification vector Y, of length n, from the message, typically using a predefined hash function, at a hash computation step 84. Any suitable hash function that is known in the art may be used at this step. Because the last public-key equation, $Q_{n-1}(\ )$, has been discarded, however, the most significant element of Y, $y_{n-1}$, is actually a free variable and may be set to any desired value in F for the purpose of calculating the signature X.

Therefore, processor 28 chooses $y_{n-1}$ so as to generate $Z'=B^{-1}Y$ such that $z'_{n-1}=0$ (i.e., the most significant element of Z', seen as a polynomial, is zero), at an intermediate vector computation step 86. The processor then uses the stored vectors $V_a$ in order to find a vector X' satisfying the polynomial relation $P(X')=(1+aT)Z'$, at a polynomial inversion step 88. As noted earlier, the processor finds multiple candidate values $W_a$ of X' by performing a single exponentiation, $Z'^d$, and multiplying the result by $V_a$: $W_a=V_a Z'^d$. Processor 28 tests each candidate $W_a$ to ascertain whether it meets the additional constraints (such as $(W_a)_0=0$) that have been incorporated in the public key-based computation Q(X). Upon finding a suitable candidate, the processor computes and outputs the actual signature, $X=A^{-1}X'$, at a signature output step 90.

If no suitable candidate is found at step 88, the processor may return to step 84 and take a different Y (by adding a dummy field to the message, for example, so that the hash result will be different). The processor then repeats steps 86 and 88 until it finds a valid signature.

Figure 4:
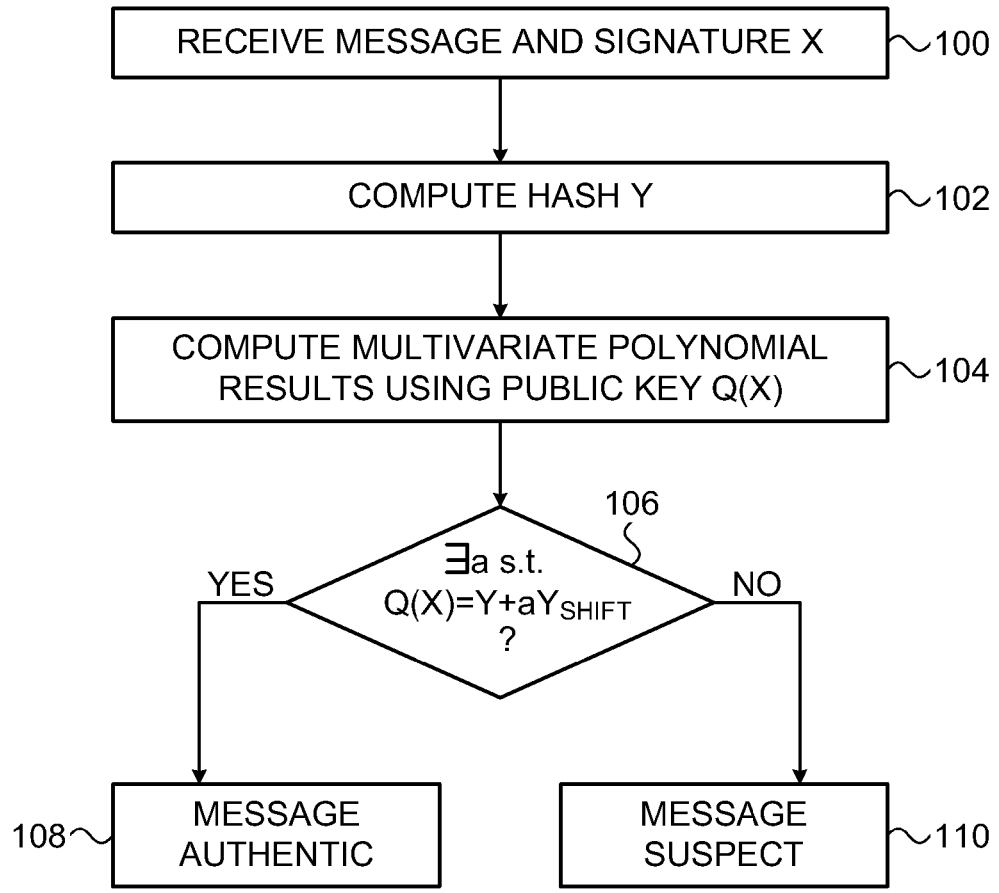
FIG. 4 is a flow chart that schematically illustrates a method for verifying a digital signature, in accordance with an embodiment of the present invention.

FIG. 4 is a flow chart that schematically illustrates a method used by device 24 to verify the digital signature of a message, in accordance with an embodiment of the present invention. (Again, the method is described with reference to the elements of system 20, in FIG. 1, solely for the sake of clarity, and not limitation.) The method is initiated when device 24 receives a message with a signature X, at a method reception step 100. Processor 42 computes the verification vector Y using the same predefined hash function as was used in generating the signature, at a hash computation step 102. The processor uses the public key of server 22 that is stored in memory 46 to set up and compute the output values of the multivariate quadratic mapping Q(X), at a mapping computation step 104.

Processor 46 compares the vector of output values of Q(X) to the vector sum $Y+aY_{SHIFT}$ for each of the possible values of the shift factor a in F, at an output comparison step 106. Specifically, the processor computes an initial value $a=(Q_0-Y_0)Y_1$ or $a=0$ if $Y_1=0$ and then verifies that this value satisfies the remaining equations. The comparison is thus simple and typically requires only a small number of multiplications and additions to check whether the initial value of a is valid. If the processor finds a shift factor that gives a solution, $Q(X)=Y+aY_{SHIFT}$ it accepts the message as authentic, at a message verification step 108. Otherwise, the processor considers the message to be suspect, and takes appropriate action, at a message rejection step 110.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A cryptographic method, comprising:
providing a public key that defines a multivariate polynomial mapping Q( ) over a finite field F;
extracting a first vector Y of verification values from a message where $Y=(Y_1, \ldots, Y_n)$;
computing, using a processor, a digital signature X for the first vector Y, X comprising a second vector of signature values, where $X=(X_0, \ldots, X_{n-1})$, such that application of the mapping to the digital signature gives a third vector Q(X) of output values, where $(Q_0(X), \ldots, Q_n(X))=(Y_0+aY_1, Y_1+aY_2, \ldots, Y_{n-1}+aY_n, Y_n)$ such that each output value is equal to a corresponding element of a vector sum $Y+aY_{SHIFT}$ over F, wherein $Y_{SHIFT}$ is a shifted version of Y, a does not equal zero, and $a \in F$; and
conveying the message with the digital signature to a recipient for authentication using the public key.

2. The method according to claim 1, and comprising:
receiving the message with the digital signature;
extracting the first vector Y of the verification values from the received message; and
authenticating the message by applying the mapping defined by the public key to find the output values, and finding a factor $a \in F$ such that each output value is equal to the corresponding element of the vector sum $Y+aY_{SHIFT}$.

3. The method according to claim 1, wherein extracting the first vector comprises applying a predefined hash function to the message.

4. The method according to claim 1, wherein the multivariate polynomial mapping is a quadratic mapping.

5. The method according to claim 1, wherein computing the digital signature comprises:

applying an affine transform $B^{-1}$ to the first vector Y in order to compute an intermediate vector Z'; and
applying a univariate polynomial function $P^-(Z')$, corresponding to the multivariate polynomial mapping, over an extension field of F in order to find the digital signature in a polynomial representation X'.

6. The method according to claim 5, wherein B comprises a right-to-left Toeplitz matrix.

7. The method according to claim 5, wherein $P^{-1}(Z')=(U(T))^d Z'^d$, wherein U is a polynomial in the extension field over a variable T with at least one coefficient given by the factor a, and d is an exponent, and
wherein computing the digital signature comprises pre-computing and storing respective power vectors $V_a=(U(T))^d$ for multiple possible factors $a \in F$, and using the stored power values in order to compute and test multiple candidate digital signatures X' for a given exponentiation of $Z' \to Z'^d$.

8. The method according to claim 7, wherein $U(T)=(1+aT)$.

9. The method according to claim 7, wherein the multivariate polynomial mapping Q( ) comprises at least one additional constraint not imposed by the univariate polynomial function, and wherein computing the digital signature comprises testing the multiple candidate digital signatures X' for different power vectors $V_a$ in order to find the digital signature X that satisfies the at least one additional constraint.

10. The method according to claim 5, wherein applying the affine transform comprises setting at least one of the values $y_i$ in the first vector Y so that at least one corresponding intermediate value in the intermediate vector Z' is zero, and
wherein providing the public key comprises, discarding at least one equation corresponding to the at least one of the values $y_i$ from the multivariate polynomial mapping Q( ) that is defined by the public key.

11. A cryptographic method, comprising:
receiving a message with a digital signature X, for verification using a predefined public key, which defines a multivariate polynomial mapping Q( ) over a finite field F;
extracting a first vector Y of verification values from the received message;
applying the multivariate polynomial mapping to the digital signature so as to find a second vector of output values Q(X); and
authenticating the message by finding a factor $a \in F$ such that each output value is equal to the corresponding element of a vector sum $Y+aY_{SHIFT}$.

12. The method according to claim 11, wherein extracting the first vector comprises applying a predefined hash function to the message.

13. The method according to claim 11, wherein the multivariate polynomial mapping is a quadratic mapping.

14. The method according to claim 11, and comprising rejecting the message if no factor $a \in F$ can be found to authenticate the message.

15. Cryptographic apparatus, comprising:
a memory, which is configured to store a private key corresponding to a public key that defines a multivariate polynomial mapping Q( ) over a finite field F; and
a processor, which is configured to extract a first vector Y of verification values from a message, where $Y=(Y_1, \ldots, Y_n)$, and to compute, using the private key, a digital signature X for the first vector Y, X comprising a second vector of signature values, where $X=(X_0, \ldots, X_{n-1})$, such that application of the mapping to the digital signature gives a third vector Q(X) of output values, where $(Q_0(X), \ldots, Q_n(X))=(Y_0 aY_1, Y_1+aY_2, \ldots, Y_{n-1}+aY_n,$ $Y_n$) such that each output value is equal to a corresponding element of a vector sum $Y + aY_{SHIFT}$ over F, wherein $Y_{SHIFT}$ is a shifted version of Y, a does not equal zero, and a∈F, and to convey the message with the digital signature to a recipient for authentication using the public key.

16. The apparatus according to claim 15, and comprising a device coupled to receive the message with the digital signature, to extract the first vector Y of the verification values from the received message, and to authenticate the message by applying the mapping defined by the public key to find the output values, and finding a factor a∈F such that each output value is equal to the corresponding element of the vector sum $Y + aY_{SHIFT}$.

17. The apparatus according to claim 15, wherein the processor is configured to extract the first vector by applying a predefined hash function to the message.

18. The apparatus according to claim 15, wherein the multivariate polynomial mapping is a quadratic mapping.

19. The apparatus according to claim 15, wherein the processor is configured to compute the digital signature by applying an affine transform $B^{-1}$ to the first vector Y in order to compute an intermediate vector Z', and applying a univariate polynomial function $P^{-1}(Z')$, corresponding to the multivariate polynomial mapping, over an extension field of F in order to find the digital signature in a polynomial representation X'.

20. The apparatus according to claim 19, wherein B comprises a right-to-left Toeplitz matrix.

21. The apparatus according to claim 19, wherein $P^{-1}(Z') = (U(T))^d Z'^d$, wherein U is a polynomial in the extension field over a variable T with at least one coefficient given by the factor a, and d is an exponent, and
wherein the processor is configure to precompute and store respective power vectors $V_a = (U(T))^d$ for multiple possible factors a∈F, and to use the stored power values in order to compute and test multiple candidate digital signatures X' for a given exponentiation of $Z' \to Z'^d$.

22. The apparatus according to claim 21, wherein $U(T) = (1+aT)$.

23. The apparatus according to claim 21, wherein the multivariate polynomial mapping Q( ) comprises at least one additional constraint not imposed by the univariate polynomial function, and wherein the processor is configured to test the multiple candidate digital signatures X' for different power vectors $V_a$ in order to find the digital signature X that satisfies the at least one additional constraint.

24. The apparatus according to claim 19, wherein the processor is configured to set at least one of the values $y_i$ in the first vector Y so that at least one corresponding intermediate value in the intermediate vector Z' is zero, and to discard at least one equation corresponding to the at least one of the values $y_i$ from the multivariate polynomial mapping Q( ) that is defined by the public key.

25. Cryptographic apparatus, comprising:
a memory, which is configured to store a predefined public key, which defines a multivariate polynomial mapping Q( ) over a finite field F; and
a processor, which is configured to receive a message with a digital signature X, for verification using the public key, to extract a first vector Y of verification values from the received message, to apply the multivariate polynomial mapping to the digital signature so as to find a second vector of output values Q(X), and to authenticate the message by finding a factor a∈F such that each output value is equal to the corresponding element of a vector sum $Y + aY_{SHIFT}$.

26. The apparatus according to claim 25, wherein the processor is configured to extract the first vector by applying a predefined hash function to the message.

27. The apparatus according to claim 25, wherein the multivariate polynomial mapping is a quadratic mapping.

28. The apparatus according to claim 25, wherein the processor is configured to reject the message if no factor a∈F can be found to authenticate the message.

29. A non-transitory computer-readable medium in which program instructions are stored, which instructions, when read by a processor, cause the processor to read from a memory a private key corresponding to a public key that defines a multivariate polynomial mapping Q( ) over a finite field F, to extract a first vector Y of verification values from a message, where $Y = (Y_1, \ldots, Y_n)$ to compute, using the private key, a digital signature X for the first vector Y, X comprising a second vector of signature values, where $X = (X_0, \ldots, X_{n-1})$, such that application of the mapping to the digital signature gives a third vector Q(X) of output values, where $(Q_0(X), \ldots, Q_n(X)) = (Y_0 + aY_1, Y_1 + aY_2, \ldots, Y_{n-1} + aY_n, Y_n)$ such that each output value is equal to a corresponding element of a vector sum $Y + aY_{SHIFT}$ over F, wherein $Y_{SHIFT}$ is a shifted version of Y, a does not equal zero, and a∈F, and to convey the message with the digital signature to a recipient for authentication using the public key.

30. A non-transitory computer-readable medium in which program instructions are stored, which instructions, when read by a processor, cause the processor to read from a memory a predefined public key, which defines a multivariate polynomial mapping Q( ) over a finite field F, to receive a message with a digital signature X, for verification using the public key, to extract a first vector Y of verification values from the received message, to apply the multivariate polynomial mapping to the digital signature so as to find a second vector of output values Q(X), and to authenticate the message by finding a factor a∈F such that each output value is equal to the corresponding element of a vector sum $Y + aY_{SHIFT}$.

31. A cryptographic method, comprising:
providing a public key that defines a multivariate polynomial mapping Q( ) over a finite field F;
extracting a first vector Y of verification values from a message;
computing over the first vector, using a processor, a digital signature X comprising a second vector of signature values such that application of the mapping to the digital signature gives a third vector Q(X) of output values such that each output value is equal to a corresponding element of a vector sum $Y + aY_{SHIFT}$ over F, wherein $Y_{SHIFT}$ is a shifted version of Y, and a∈F;
applying an affine transform $B^{-1}$ to the first vector Y in order to compute an intermediate vector Z';
applying a univariate polynomial function $P^{-1}(Z')$, corresponding to the multivariate polynomial mapping, over an extension field of F in order to find the digital signature in a polynomial representation X'; and
conveying the message with the digital signature to a recipient for authentication using the public key, wherein $P^{-1}(Z) = (U(T))^d Z'^d$, wherein U is a polynomial in the extension field over a variable T with at least one coefficient given by the factor a, and d is an exponent, and
wherein computing the digital signature comprises precomputing and storing respective power vectors $V_a = (U(T))^d$ for multiple possible factors a∈F, and using the stored power values in order to compute and test multiple candidate digital signatures X' for a given exponentiation of $Z' \to Z'^d$.

32. Cryptographic apparatus, comprising:

a memory, which is configured to store a private key corresponding to a public key that defines a multivariate polynomial mapping Q( ) over a finite field F; and a processor, which is configured to extract a first vector Y of verification values from a message, and to compute over the first vector, using the private key, a digital signature X comprising a second vector of signature values such that application of the mapping to the digital signature gives a third vector Q(X) of output values such that each output value is equal to a corresponding element of a vector sum $Y+aY_{SHIFT}$ over F, wherein $Y_{SHIFT}$ is a shifted version of Y, and a∈F, and to convey the message with the digital signature to a recipient for authentication using the public key, wherein the processor is configured to compute the digital signature by applying an affine transform $B^{-1}$ to the first vector Y in order to compute an intermediate vector Z', and applying a univariate polynomial function $P^{-1}(Z')$, corresponding to the multivariate polynomial mapping, over an extension field of F in order to find the digital signature in a polynomial representation X', wherein $P^{-1}(Z')=(U(T))^d Z'^d$, wherein U is a polynomial in the extension field over a variable T with at least one coefficient given by the factor a, and d is an exponent, and wherein the processor is configure to precompute and store respective power vectors $V_a=(U(T))^d$ for multiple possible factors a∈F, and to use the stored power values in order to compute and test multiple candidate digital signatures X' for a given exponentiation of $Z' \rightarrow Z'^d$.

* * * * *

UNITED STATES PATENT AND TRADEMARK OFFICE
CERTIFICATE OF CORRECTION

PATENT NO. : 8,958,560 B2
APPLICATION NO. : 13/699912
DATED : February 17, 2015
INVENTOR(S) : Kipnis et al.

It is certified that error appears in the above-identified patent and that said Letters Patent is hereby corrected as shown below:

In the Specification

In column 2, line 37, delete "V," and substitute therefor --$V_a$--;

In column 5, line 9, delete "X' = $P^{-1}(Z)Z^d$," and substitute therefor --X' = $P^{-1}(Z) = Z^d$,--;

In column 7, line 13, delete "$Y_{SHIFT} = (y_2, y_2, ...)$" and substitute therefor --$Y_{SHIFT} = (y_1, y_2, ...)$--;

In column 7, line 26, delete "$Q_{n-2}(X) = y_{n-2}\ ay_{n-1}$" and substitute therefor --$Q_{n-2}(X) = y_{n-2} + ay_{n-1}$--;

In the Claims

In column 10, line 3 (fifth line of claim 5), delete "P'(Z')," and substitute therefor --$P^{-1}(Z')$,--.

Signed and Sealed this
Fifth Day of May, 2015

Michelle K. Lee
*Director of the United States Patent and Trademark Office*